United States Patent Office 2,960,830
Patented Nov. 22, 1960

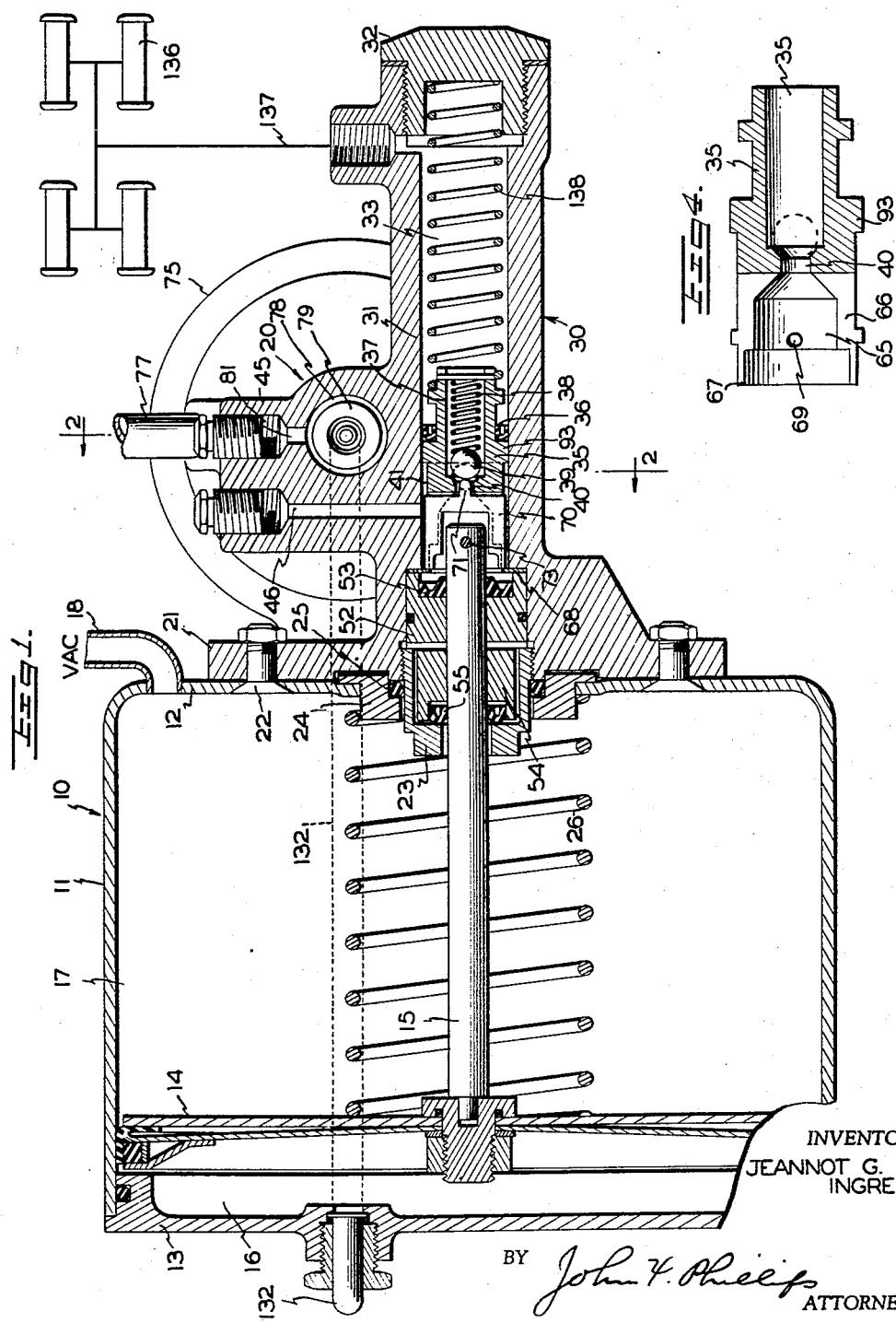

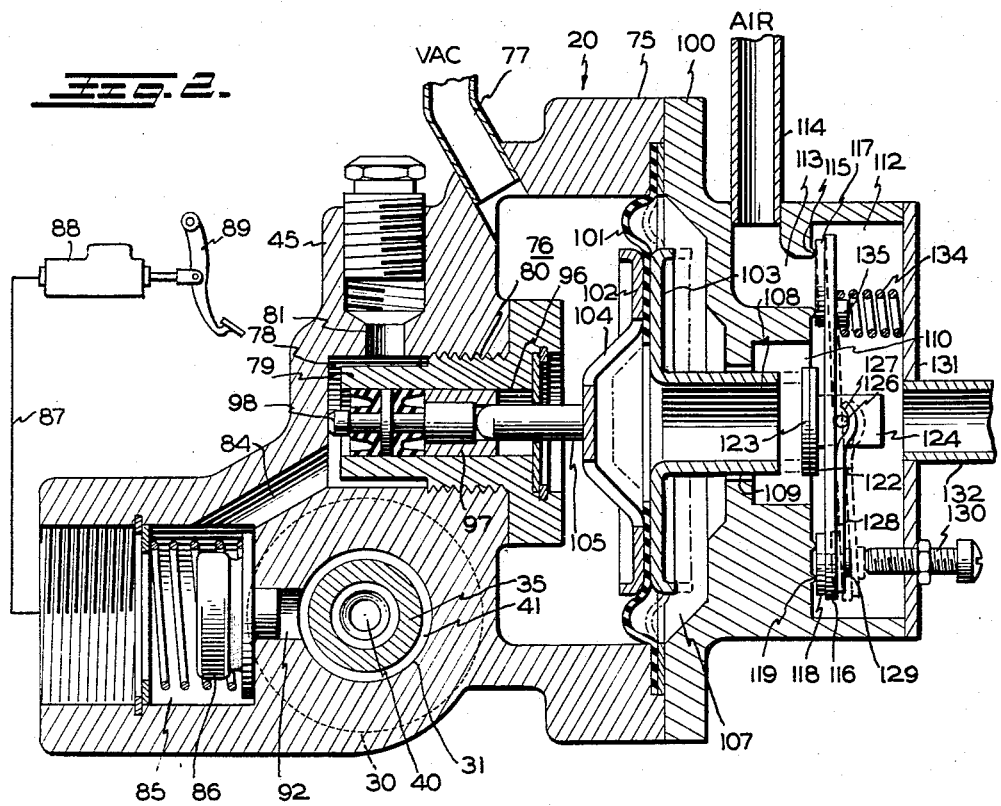

2,960,830

BOOSTER BRAKE MECHANISM

Jeannot G. Ingres, Dearborn, Mich., assignor to Kelsey-Hayes Company, a corporation of Delaware Filed Aug. 30, 1955, Ser. No. 531,437

12 Claims. (Cl. 60—54.6)

This invention relates to a booster brake mechanism and more particularly to such type of mechanism wherein a conventional foot-operated master cylinder is employed for providing a source of hydraulic pressure for operating the valve mechanism of the booster motor to energize the latter.

There are two general types of motor vehicle booster brake mechanisms now in use. In one type, the brake pedal is utilized for the direct manual operation of a valve mechanism which is movable by the brake pedal from a normal off position to energize the booster motor which assists the brake pedal in applying braking forces to the wheels of the vehicle. In the other type of brake mechanism, a conventional master cylinder is used and is directly connected to the brake pedal in the usual way. Fluid displaced from the master cylinder usually is utilized for moving at least some of the brake shoes into engagement with the brake drums of the wheels, and the fluid pressure developed by the master cylinder is utilized for effecting operation of the valve mechanism which causes energization of the booster motor. A brake mechanism of the latter type is disclosed in my copending application Serial No. 455,647, filed September 13, 1954, now Patent No. 2,905,151, granted September 22, 1959.

The apparatus disclosed in the copending application referred to has been found highly efficient and dependable in operation. However, in common with other vehicle booster brake mechanisms, the movement of the valve mechanism from normal off position to energize the motor effects too rapid an admission of pressure fluid into the motor. Therefore, while the mechanism provides a highly desirable "soft" pedal in initial operation of the brake mechanism, energization of the motor is inclined to cause too rapid an application of the brakes in proportion to movement of the brake pedal. Mechanisms of this type provide for the transmission to the brake pedal of reaction forces proportional to the degree of brake application, and where such application occurs somewhat too rapidly upon initial energization of the motor, there is a corresponding relatively sudden reaction transmitted to the brake pedal. This does not affect the operation of the apparatus, but it is preferred that it be prevented in order that pedal reactions increase with a greater degree of smooth uniformity.

An important object of the present invention is to provide a booster brake mechanism wherein the booster motor is controlled by a valve mechanism of such character that sudden enrgization of the motor upon movement of the valve mechanism from normal position is prevented, the valve mechanism and its operation being of such nature as to tend to progressively energize the motor instead of rather suddenly effecting initial energization of the motor.

A further object is to provide an apparatus of the character referred to which lends itself particularly well to use in connection with that type of booster brake mechanism wherein fluid displaced from a conventional pedal operated master cylinder is utilized for effecting valve actuation.

A further object is to provide such an apparatus wherein the valve which admits relatively high pressure to the booster motor is tilted with respect to its associated opening through which relatively high pressure is admitted to the booster motor, whereby one side of said opening is initially rendered effective for admitting higher pressure into the booster motor instead of relatively rapidly admitting such pressure with a consequent relatively sudden energization of the booster motor.

A further object is to provide such an apparatus wherein the controlling of the valve is through the medium of a lever pivoted at one end and to which movement is imparted in accordance with the displacement of fluid from the pedal operated master cylinder, initial application of force to the pedal causing the lever to pivot and open angularly with respect to the high pressure opening which it controls, whereby high pressure fluid for energizing the motor is first admitted solely through one side of the admission port, thus tending to retard initial energization of the motor in the initial stages of brake operation, this operation resulting in a smoother and more progressive operation of the brakes and the transmission of reaction to the brake pedal.

A further object is to provide an apparatus of the character referred to wherein the master cylinder operated control means for the valve mechanism need not be spring-biased to its return position, such operation taking place as an inherent characteristic of the mechanism, thus further assisting in providing a "soft" pedal and a smoothly operating brake mechanism.

A further object is to provide such a mechanism wherein the hydraulically operated means for effecting motor-energizing movement of the valve mechanism takes place freely due to unrestricted communication with the master cylinder, and to provide means in the nature of a residual pressure valve for tending to resist movement of hydraulic fluid from the master cylinder to the back of the motor-operated fluid displacing plunger for the brake cylinders, thus providing for energization of the motor prior to the application of pedal-generated forces for applying the brakes.

Other objects and advantages of the invention will become apparent during the course of the following description.

In the drawings I have shown one embodiment of the invention. In this showing:

Figure 1 is an axial sectional view through the booster mechanism, the wheel cylinders and the fluid lines thereto being diagrammatically shown;

Figure 2 is an enlarged section on line 2—2 of Figure 1;

Figure 3 is a perspective view of the valve elements and the elements associated therewith, the parts being shown separated; and Figure 4 is a detail axial sectional view through the fluid displacing plunger.

The valve mechanism of the present invention is shown in conjunction with that type of booster mechanism which employs pressure of hydraulic fluid displaced from the master cylinder for energizing the booster motor, the fluid displaced from the master cylinder being preferably utilized to effect initial booster motor energization to move the brake shoes into engagement with the drums prior to assisting the booster motor in brake application. It will become apparent, however, that the valve mechanism is not limited to use in conjunction with such specific type of booster mechanism, although it is particularly adaptable for such use.

Referring to Figure 1, the numeral 10 designates a booster motor as a whole comprising a cylinder 11 having at one end a preferably integral head 12. The other end of the cylinder is closed by a removable head 13. A piston 14 of any desired type is mounted to reciprocate in the cylinder 11 and is provided with a piston rod 15 movable to the right as viewed in Figure 1 when the motor is energized as referred to further below. The piston 14 divides the motor to form a variable pressure chamber 16 and a constant pressure chamber 17. The motor is shown in the present instance as being of the vacuum suspended type, and the chamber 17 is in constant communication through a duct 18 with a source of suitable vacuum (not shown).

A preferably die-cast body 20 is provided at one end with a cylindrical flange 21 bolted as at 22 to the cylinder head 12. Coaxially of the motor, a hollow nut 23 is threaded into the adjacent end of the body 20. An annular member 24 is fixed in position relative to the flange 21 and head 12, as shown in Figure 1, and cooperates with the body 20 to form an annular recess receiving a seal 25, preferably in the form of an O-ring, arranged in sealing engagement with the outer surface of the nut 23 to the left of the threads thereof. A piston return spring 26 seats at one end against the piston 14 and has its other end surrounding the annular member 24 and engaging against the head 12.

The body 20 further includes a preferably integral cylindrical extension 30 coaxial with the motor and provided therein with a bore 31 closed at one end by a cap 32 and forming a hydraulic chamber 33. A plunger 35 is slidable in the bore 31 and is sealed with respect thereto by a double lipped seal 36 surrounding the plunger 35. The plunger is provided with a bore 37 in which is arranged a spring 38 engaging a ball valve 39 to urge the latter to the left to close a port 40 communicating between the bore 37 and the left-hand end of the bore 31 (Figure 1), which portion of the bore forms an inlet chamber 41 for hydraulic fluid from the master cylinder, as described below.

The body 20 is provided with an enlargement 45 in one side of which, as viewed in Figure 1, is formed a passage 46. The passage 46 communicates at one end with the chamber 41 and has its other end provided with a suitable conventional bleed plug from which air may be bled from the system when the apparatus is installed.

A bearing 52 is mounted in the left-hand end of the body 20 and is provided with a double lipped seal 53 sealing the piston rod 15 against leakage therearound. The bearing 52 serves as an axial guide for the piston rod 15, as will be apparent. A second bearing for the piston rod 15, indicated by the numeral 54, is mounted to float laterally in the nut 23 and is sealed as at 55 with respect to the piston rod 15 to prevent leakage therearound. The seal 55 is fully operative without the anchoring of the bearing 54, this bearing preferably being mounted to float to eliminate the extreme accuracy which would be necessary in boring the openings of the two bearings 52 and 54 in exact axial alinement.

The plunger 35 extends substantially to the left of the port 40 as viewed in Figures 1 and 4, and such extended end of the plunger is axially recessed as at 65 and diametrically slotted as at 66. The left-hand extremity 67 of the plunger 35 seats against a washer 68 (Figure 1) held in position by the bearing 52. The opposite sides of the slotted portion 66 of the plunger are provided with alined openings 69 for a purpose to be described. Within the slot 66 is arranged a flat substantially U-shaped member 70 the extremities of the opposite arms of which seat against the washer 68 to limit movement of the member 70 toward the left as viewed in Figure 1. The member 70 is provided with an axial extension 71 projecting through the port 40 and unseating the ball 39 when the parts are in the off positions shown in Figure 1. The right-hand end of the piston rod 15 extends into the recess 65 and between the arms of the member 70 and is provided with a transverse pin 73 extending into the openings 69 to connect the rod 15 to the plunger 35.

The body 20 is provided with an annular enlargement 75 the axis of which is arranged above and at right angles to the axis of the bore 31. The enlargement 75 is provided therein with a vacuum chamber 76 into which is tapped a line 77 connected to a suitable source of vacuum. The body 20 is further provided to the left of the chamber 76 (Figure 2) with a chamber 78 into which projects one end of a nut 79 threaded as at 80 into the body 20. The chamber 78 is provided with a vent passage 81 supplied in its upper end with a bleed plug from which air may be bled from the chamber 78 and associated spaces and passages when the apparatus is installed.

The chamber 78 communicates through a passage 84 with a chamber 85 in which is arranged a conventional residual pressure valve device 86. The chamber 85 communicates through a line 87 (Figure 2) with a conventional master cylinder 88 the plunger (not shown) of which is operable by a pedal 89 for displacing fluid into the chamber 85. When the pedal 89 is depressed to displace fluid through the line 87, and when the hydraulic fluid attains a sufficient pressure to overcome the residual pressure valve 86, the fluid flows through a port 92 into the chamber 41. The port 92 is shown in dotted lines in Figure 1, and it will be noted that this port is back of an annular flange 93 against which the seal 36 seats. Hydraulic pressure generated by the master cylinder, accordingly, tends to force the plunger 35 toward the right as viewed in Figure 1, but only after the motor 10 is energized, as further referred to below.

The nut 79 is provided with a bore 96 (Figure 2) in which is slidable a sealed plunger 97 having at one end a reduced stem 98 engageable with the wall of the chamber 78 adjacent the passage 84 to limit movement of the plunger 97 toward the left as viewed in Figure 2.

The enlargement 75 is provided with a cap member 100 and between this cap and the end of the enlargement 75 is clamped a diaphragm 101. The inner edge of this diaphragm is clamped between a pair of plates 102 and 103 the former of which is provided with spider arms 104 the centers of which carry a pin 105 operable by the plunger 97. The assembly of elements 101, 102 and 103 preferably is not spring biased to the left to its normal position. A chamber 107 is formed between the cap 100 and diaphragm 101 for a purpose to be described.

The plate 103 carries an axial tubular extension 108 freely slidable through an opening 109 formed in the cap member 100. The cap member 100 is recessed as at 110 to provide a chamber normally communicating with the interior of the tubular extension 108, and the interior of such extension is in fixed communication with the vacuum chamber 76, as will be apparent.

The cap member 100 is provided with a chamber 112 in fixed communication with the chamber 110. The member 100 is provided with an air port 113 communicating with one end of a duct 114 the other end of which is preferably provided with an air cleaner (not shown). The inner end of the port 113 terminates in a raised annular rib 115 forming a valve seat for a purpose to be described.

A lever 116 is mounted in the chamber 112, which, as shown in Figure 3, is relatively narrow. One end of the lever 116 is provided with a resilient poppet valve 117 normally engaging the valve seat 115. At its other end, the lever is provided with a spacer washer 118 engageable with an annular raised rib 119 which tends to assist in maintaining the lever 116 square with respect to the seat 115, thus assisting in fully seating the resilient valve 117.

A valve disk 122 is provided with a resilient valve element 123 adapted to be engaged by and seat against the adjacent end of the tubular extension 108. The disk 122 is provided with a relatively flat stem 124 extending relatively loosely in an opening 125 in the lever 116, thus permitting the valve 123 to squarely seat on the extension 108 regardless of the angularity of the lever 116. At the side of the lever 116 opposite the valve disk 122, a pin 126 extends through the stem 124 and is engageable back of the curved end 127 of a spring clip 128 secured to the lever 116 by a rivet 129 or other fastening element. This rivet is engageable by an adjusting screw 130 threaded through a cap 131 secured to the adjacent end of the cap member 100 and forming a closure for the chamber 112.

A motor control conduit 132 communicates at one end with the chamber 112 through the cap 131. This conduit communicates through the motor head 13 (Figure 1) with the variable pressure motor chamber 16. A spring 134 is arranged between the cap 131 and the lever 116 and has its inner end surrounding and positioned by a boss 135 carried by the lever 116.

As previously stated, the present apparatus is particularly adapted for use in conjunction with the type of booster system illustrated, but it will be apparent that the valve mechanism may be employed with other types of boosters or power brakes. It also will be apparent that the present mechanism may be connected in a system intended to provide different applications of the front and rear wheels of the vehicle. For the purpose of illustration, however, the present system has been shown for displacing fluid into all four wheel cylinders of a four-wheel vehicle. Such cylinders are designated in Figure 1 by the numeral 136, and fluid flows to the brake cylinders from the chamber 33 through a pipe line 137. The piston 35 is operated in the present instance both by the power of the motor and by the pressure of fluid displaced from the master cylinder, and the plunger is biased to its normal off position by a spring 138 in the chamber 33. This spring operates against the plunger 35 to move the plunger to the off position, and when such position is fully reached the parts will assume the positions shown in Figure 1 with the ball valve 39 open for a purpose which will be described below.

*Operation*

The parts normally occupy the positions shown in Figure 1 and in solid lines in Figure 2. The motor chamber 17 is in constant communication with the vacuum source through the duct 18. Referring to Figure 2, the valve 117 will be closed and the chamber 112 communicates around the lever 116 with the interior of the tubular extension 108 and thence through the arms of the spider 104 with the vacuum chamber 76. This chamber is in fixed communication with the vacuum source through duct 77 and the motor chamber 16 (Figure 1) is in constant communication with the chamber 112 through the line 132. Accordingly, vacuum exists in both motor chambers 16 and 17.

When the apparatus is to be operated, the pedal 89 will be depressed to displace fluid from the master cylinder 88 (Figure 2) through line 87 into the chamber 85. A predetermined pressure in this chamber must be built up before the residual pressure valve 86 opens to supply hydraulic fluid through passage 92 into the chamber 41 (Figure 1). In the meantime, hydraulic fluid flows freely from chamber 85 through passage 84 to actuate the plunger 97, thus moving the stem 105 and the parts connected thereto toward the right as viewed in Figure 2. This operation takes place solely against negligible friction, leakage around the tubular extension 108 through opening 109 exhausting air from chamber 107 to balance pressures on opposite sides of the diaphragm 101.

Movement of the stem 105 to the right in Figure 2 seats the end of the tubular extension 108 against the valve 123, thus closing the vacuum passage through the extension 108. The next increment of movement of the extension 108 transmits movement to the lever 116 intermediate the ends thereof. Inasmuch as the spring 134 exerts greater force against the lever 116 adjacent the atmospheric opening 113 than at the other end of the lever, such other end of the lever will move first toward the dotted-line position shown in Figure 2. The lever 116 therefore will fulcrum on the top portion of the rib or valve seat 115, as viewed in Figure 2. The corresponding side of the atmospheric opening 113, accordingly, will remain closed, and the other or lower side in Figure 2 will be "cracked" to admit air at a restricted rate from the chamber 113 into the chamber 112 to flow through the line 132 into the motor chamber 16.

In accordance with the foregoing operation, energization of the motor 10 will start and the piston 14 will move toward the right. One of the disadvantages of prior booster motors resides in the fact that when such motors are initially energized, the rate of energization is too great. As a result, particularly where a "soft" pedal is desired, the operator meets little initial resistance to movement of the pedal 89, but reaction transmitted to the pedal by hydraulic pressure in the hydraulic chamber of the booster increases rapidly and makes the pedal almost immediately become "hard." The reaction is transmitted in the present case in the manner described below.

Since only one side of the valve seat 115 will be initially slightly opened, the initial flow of air into the motor chamber 16 will be restricted to cause a more gradual energization of the booster motor. This is all of the energization necessary for a slight brake application. Assuming a heavier application is desired, the displacing of more fluid from the master cylinder 88 will effect further movement of the plunger 97 (Figure 2) and the parts actuated thereby. The rivet head 129 will engage the adjustable stop screw 130 to limit further movement of the corresponding end of the lever 116 toward the right. Additional movement transmitted to the lever 116 through the valve 123 will then swing the upper end of the lever 116, as viewed in Figure 2, to more widely open the valve 117 and provide a more rapid flow of air into the motor chamber 16.

Upon initial motor energization, the piston rod 15, through the pin 73, moves the plunger 35 toward the right in Figure 1. The plunger end 67 (Figure 4) moves out of contact with the washer 68 while the ends of the arms of the member 70 remain in contact with such washer. Upon slight movement of the plunger 35, therefore, the ball 39 will seat and cut off communication between the chambers 33 and 41. Thereafter, pressure in the chamber 33 will be greater than pedal-generated pressure in the chamber 41, and the valve 39 will remain closed while the fluid displaced from the master cylinder into the chamber 41 is effective through its pressure to assist in moving the plunger 35 toward the right in Figure 1. This plunger accordingly is moved by both motor power and pedal-generated pressures.

In connection with the foregoing, attention is invited to the fact that the flow of hydraulic fluid from the master cylinder to the chamber 78 is unrestricted, the flow of fluid freely taking place from the chamber 85 through passage 84. Of course, the master cylinder 88 is provided with a conventional residual pressure valve. This offers minor and conventional resistance to the flow of hydraulic fluid from the master cylinder through line 87, but the presence of the residual pressure valve 86 prevents the flow of fluid through passage 92 (Figure 2) into the chamber 41 until after the valve operating plunger 97 has been operated. Accordingly, it will be apparent that at least initial motor actuation takes place prior to the transmission of pedal generated pressures to the chamber 41 to assist in moving the plunger 35. As a matter of fact, for light relatively gradual brake applications, movement of the plunger 35 effected by the booster motor will reduce pressures in the chamber 41, thus creating differential pressures in the chambers 41 and 85 (Figure 2) which will effect the opening of the residual pressure valve 86 without effort on the part of the operator.

It will become apparent that in later stages of operation, pedal-generated pressures will be duplicated in the chamber 41 to assist the motor piston 10 in moving the plunger 35 to generate braking forces in the chamber 33.

The member 70 floats in the slot 66 and is prevented from moving from the left-hand end of this slot in Figure 1 by engagement with the piston rod 15. Therefore the member 70 exerts no pressure against the ball valve 39 during brake actuation to tend to unseat such valve. The brakes may be applied to any extent up to the maximum brake application, as will be apparent.

When the parts are in the normal positions shown in Figure 2, the air chamber 113 is sealed and vacuum exhausts air from the chamber 107 at the right-hand side of the diaphragm 101 and, accordingly, pressures will be balanced on opposite sides of the diaphragm. When the valve 123 is closed and the valve 117 is opened, this vacuum is prevented from so acting and atmospheric pressure seeps into the chamber 107 to assist in opposing movement of the diaphragm toward the right. This opposition is increased by air pressure acting on the disk 122.

In this connection it will be noted that a rise in pressure in the chamber 107 occurs relatively gradually, since it is restricted to leakage through the opening 109. This operation has two highly advantageous effects. In the first place, it provides resistance to movement of the diaphragm 101 and the elements carried thereby to the right, thus providing elastic fluid reaction against movement of the plunger 97, which reaction is transmitted to the brake pedal. Movement of the brake pedal is thus progressively but not heavily resisted and the resistance is not built up suddenly as would be true if the chamber 107 were suddenly opened to atmospheric pressure. In the second place, it has been found in practice that the building up of pressure in the chamber 107 definitely prevents any tendency for the elements of the valve mechanism to chatter, which operation could take place if both chambers 76 and 107 remained connected to the source of vacuum. There is a third advantage of building up pressure in the chamber 107, and such advantage is referred to below. In view of the foregoing, it will be apparent that the greater the energization of the motor the greater will be the opposition to movement of the plunger 97, and this provides an accurate follow-up action of the motor piston. For example, if a partial brake application is made and the movement of the pedal is arrested, the hydraulic pressure in the chamber 78 will be overcome by air pressure acting toward the left in the manner stated, to prevent further opening movement of the valve 117.

It will be apparent, therefore, that the valve mechanism controls energization of the motor and that such energization will be in proportion to the pedal pressure exerted by the operator. It also will be apparent that hydraulic pressure in the chamber 41, generated by the operator, will be in proportion to the hydraulic pressure in the chamber 33. Once pedal generated pressure has been built up in the chamber 41, therefore, it will be apparent that the operator performs a proportionate part of the work in applying the brakes and feels a pedal reaction proportionate to brake application. Prior to the transmission of pedal generated forces to the chamber 41, the operator is provided with an elastic fluid reaction through the functioning of the diaphragm 101 in the manner described. Hydraulic reaction pressures in the chamber 41 pick up smoothly beyond the limit of reaction provided by the diaphragm 101 and accordingly pedal reaction picks up smoothly with a total lack of lumpiness throughout the functioning of the device for applying the brakes.

When the brakes are released, the valve parts will return to the normal position shown in solid lines in Figure 2, and air will be exhausted from the motor chamber 16. The motor piston 14 and the plunger 35 will be returned to normal positions by the springs 26 and 138. Just prior to movement of the plunger 35 to its fully off position, the ends of the arms of the member 70 will engage the washer 68 and movement of the member 70 toward the left in Figure 1 will be arrested. However, the plunger 35 will partake of slight additional movement, whereupon the projection 71 will unseat the ball 39 and balance pressures in the chambers 33 and 41. This permits replenishment of any fluid leaking from the system and provides for the maintenance of proper brake line pressures through the functioning of the residual pressure valve 86, thus compensating for expansion and contraction of fluid in the brake lines.

Particular attention is invited to the fact that no spring need be employed for biasing the diaphragm 101 and its connected elements 102, 104, 105 and 108 to the left to normal positions when the brake pedal is released. During application of the brakes, the pressure rise in the chamber 107 tends to bias the parts referred to for movement toward the left (Figure 2), the differential pressures in chambers 76 and 107 thus providing pedal reaction as stated above. The higher pressure in chamber 107 remains momentarily when the brake pedal is released. Under such conditions, pressure acting against the right-hand face of the diaphragm 101 in Figure 2 biases the elements referred to to the left together with the plunger 97. This movement is assisted by the pressure of the spring 134 until the valve 117 is seated. Beyond such point, the higher pressure in the chamber 107 effects movement of the diaphragm and its associated parts to their fully off positions. In the event only a momentary operation of the brakes has taken place and the time interval for the admission of air into the chamber 107 is insufficient to provide the necessary biasing force to return the valve operating parts to normal position, then the releasing of the brake pedal reduces pressure in the line 87, chamber 85, passages 84 and chamber 78 to pull the plunger 97 to its off position. Even an extremely slight pressure in the chamber 107 is then sufficient to move the tubular member 108 out of engagement with the valve 123, there being wholly negligible friction to be overcome in effecting such movement.

It is particularly pointed out that the initial "cracking" of the valve 117 provides a remarkably smooth uniform increase in the energization of the motor 10 to eliminate the "jumping" of the booster motor piston in the stage of initial energization. In an emergency brake operation, however, when pressure is quickly generated in the master cylinder 88, the valve 117 is very rapidly opened to its fullest extent. Thus the valve mechanism provides for a fine modulation of motor energization without limiting the rapidity with which a full brake application can be effected.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A motor mechanism comprising a member to be operated, a fluid pressure motor comprising a casing, a pressure responsive unit forming with said casing a variable pressure chamber, said pressure responsive unit being connected to said member to be operated, and a valve mechanism connected for controlling pressure in said variable pressure chamber, said valve mechanism comprising a control chamber normally connected to a first source of pressure, said control chamber being in fixed communication with said variable pressure chamber, a valve seat connected to communicate between said control chamber and a second source of different pressure, a poppet valve normally engaging and closing said valve seat, a lever to one end of which said valve is connected, common means movable to engage said lever and to apply a force to said lever in a direction parallel to the axis of said poppet valve at a point eccentric to said valve and for disconnecting said control chamber from said first source of pressure, and a spring engaging said lever between said valve and said common means and biasing said end of said lever toward said valve seat, whereby movement of said lever by said common means causes said valve to initially fulcrum on one side of said valve seat to initially "crack" the other side of said valve seat to said control chamber.

2. A mechanism according to claim 1 wherein said common means comprises a tubular member mounted for sliding movement and having its interior in fixed communication with said first source of pressure, said tubular member having an open end adjacent said lever and said lever being provided with a valve engageable with said open end of said tubular member to close the latter when said tubular member is moved toward said lever, said last-named valve being mounted for movement relative to said lever to remain seated against said tubular member when said lever changes its angular position due to fulcruming on said one side of said valve seat.

3. A mechanism according to claim 1 provided with a control cylinder and a control plunger therein, said plunger forming a part of said common means, and means connected to force hydraulic fluid into said control cylinder to effect movement of said control plunger.

4. A motor mechanism comprising a member to be operated, a fluid pressure motor comprising a casing, a pressure responsive unit therein connected to said member and dividing said casing to form a pair of chambers one of which is in fixed communication with a source of relatively low pressure, and a valve mechanism connected for controlling pressure in the other of said motor chambers, said valve mechanism comprising a control chamber normally connected to said source of relatively low pressure, said control chamber being in fixed communication with said other motor chamber, a valve seat connected to communicate between said control chamber and a source of relatively high pressure, a poppet valve normally engaging and closing said valve seat, a lever to one end of which said valve is connected, common means movable to engage said lever and to apply a force to said lever in a direction parallel to the axis of said poppet valve at a point eccentric to said valve and for disconnecting said control chamber from said source of low pressure, and a spring engaging said lever between said valve and said common means and biasing said end of said lever toward said valve seat, whereby the application of a force to said lever by said common means effects movement of the other end of said lever to rock said valve on said seat to "crack" said valve seat at the side thereof adjacent said common means, and stop means arranged in the path of travel of the other end of said lever to limit said movement thereof whereby, after said other end of said lever has moved a predetermined distance, the continued application of force to said lever by said common means moves said valve wholly from said seat.

5. A hydraulic pressure generating mechanism comprising a hydraulic pressure cylinder, a pressure generating plunger movable into said cylinder to generate pressure therein, a fluid motor comprising a casing, a pressure responsive unit in said casing dividing it to form a pair of chambers one of which is in fixed communication with a source of relatively low pressure, a piston rod connected to said plunger and to said pressure responsive unit, a control valve mechanism connected for controlling pressures in the other motor chamber, said valve mechanism comprising a control chamber normally communicating with said source of low pressure to balance pressures in said motor chambers, a valve seat arranged between a source of relatively high pressure and said control chamber, a poppet valve normally engaging said seat, a lever to one end of which said valve is connected, common means movable to engage said lever and to apply a force to said lever in a direction parallel to the axis of said poppet valve at a point eccentric to said valve to effect movement of said lever and for disconnecting said control chamber from said source of low pressure, a spring engaging said lever between said valve and said common means for biasing said valve toward said seat whereby movement imparted to said lever by said common means rocks said lever on one side of said valve seat to "crack" the other side of said valve seat to said control chamber, hydraulic fluid responsive means connected for operating said common means, a manually operable master cylinder, and a hydraulic duct connected between said master cylinder and said hydraulic fluid responsive means to move the latter upon displacement of fluid from said master cylinder, said duct including a space behind said pressure generating plunger whereby hydraulic fluid pressure generated by said master cylinder assists said motor in moving said pressure generating plunger.

6. A mechanism according to claim 5 wherein said common means comprises an axially movable tubular member connected to said hydraulic pressure responsive means and having its interior in fixed communication with said source of relatively low pressure, one end of said tubular member being adjacent said lever and normally open to communication with said control chamber, and a second valve connected to said lever and engageable by the open end of said tubular member upon movement thereof to disconnect the interior thereof from said control chamber, said second valve being mounted to rock with respect to said lever to remain seated on said end of said tubular member in any angular position of said lever.

7. A mechanism according to claim 5 wherein said common means comprises an axially movable tubular member connected to said hydraulic pressure responsive means and having its interior in fixed communication with said source of relatively low pressure, one end of said tubular member being adjacent said lever and normally open to communication with said control chamber, a second valve connected to said lever and engageable by the open end of said tubular member upon movement thereof to disconnect the interior thereof from said control chamber, said second valve being mounted to rock with respect to said lever to remain seated on said end of said tubular member in any angular position of said lever, and stop means arranged in the path of travel of the other end of said lever to limit said movement thereof whereby, upon imparting a further movement to said lever by said tubular member, said first-named valve will be moved wholly away from said seat.

8. A hydraulic pressure generating mechanism comprising a hydraulic cylinder, a pressure generating plunger therein dividing said cylinder to form a first and a second hydraulic chamber, a fluid motor comprising a casing, a pressure responsive unit therein connected to said plunger and dividing said casing to form a pair of motor chambers, a valve mechanism connected for normally balancing pressures in said motor chambers and connected to be operable for connecting one of said chambers to a high pressure source whereby said pressure responsive unit moves said plunger into said first chamber to displace fluid therefrom, a control cylinder, a control piston therein connected to said valve mechanism to render the latter operable upon the introduction of hydraulic fluid into said control cylinder, said valve mechanism comprising a port connected to a high pressure source and having a valve seat, a control chamber into which said seat opens, a tubular member connected to said control piston and normally communicating with said control chamber, the interior of said tubular member communicating with a source of relatively low pressure, a lever, a high pressure poppet valve connected to said lever and normally engaging said seat, a low pressure valve connected to said lever and arranged in the path of travel of said tubular member to engage and close the latter upon movement thereof by said control piston, said lever projecting transversely of the axis of said poppet valve, and a spring engaging said lever intermediate said valves and biasing said high pressure valve toward said seat whereby when said tubular member engages said low pressure valve, said lever will be rocked on one edge of said seat as a fulcrum to "crack" the other edge of said seat to said control chamber, a pedal operable master cylinder having a duct connecting it to said control cylinder for the flow of hydraulic fluid thereinto upon operation of said master cylinder, a fluid line connected between said duct and said second chamber of said hydraulic cylinder, and a residual pressure valve in said fluid line providing for the flow of hydraulic fluid therethrough into said second chamber only after a predetermined hydraulic pressure has been built up in said duct.

9. A hydraulic pressure generating mechanism comprising a hydraulic cylinder, a pressure generating plunger therein dividing said cylinder to form a first and a second hydraulic chamber, a fluid motor comprising a casing, a pressure responsive unit therein connected to said plunger and dividing said casing to form a pair of motor chambers, a valve mechanism connected for normally balancing pressures in said motor chambers and connected to be operable for connecting one of said chambers to a high pressure source whereby said pressure responsive unit moves said plunger into said first chamber to displace fluid therefrom, a control cylinder, a control piston therein connected to said valve mechanism to render the latter operable upon the introduction of hydraulic fluid into said control cylinder, said valve mechanism comprising a control chamber connected to said one motor chamber, the other motor chamber being connected to a source of low pressure, a tubular member communicating with said low pressure source and connected to said control piston and normally communicating with said control chamber, a high pressure port having a valve seat opening into said control chamber, a lever, a first valve carried by one end of said lever and normally engaging said seat, a second valve carried by said lever intermediate its ends and arranged in the path of travel of said tubular member to engage and close it, a spring engaging said lever between said valves and biasing said first valve toward said seat whereby, when said tubular member engages said second valve, said lever will be moved to rock said first valve on said seat to "crack" one side of the latter to said control chamber, and means arranged in the path of travel of and engageable with the other end of said lever for limiting movement thereof whereby further movement of said second valve by said tubular member will move said first valve bodily away from said seat, a pedal operable master cylinder having a duct connecting it to said control cylinder for the flow of hydraulic fluid thereinto upon operation of said master cylinder, a fluid line connected between said duct and said second chamber of said hydraulic cylinder, and a residual pressure valve in said fluid line providing for the flow of hydraulic fluid therethrough into said second chamber only after a predetermined hydraulic pressure has been built up in said duct.

10. A hydraulic pressure generating mechanism comprising a hydraulic chamber, a pressure generating plunger movable thereinto to displace fluid therefrom, a fluid motor comprising a casing having a pressure responsive unit connected to said plunger and forming with said casing a variable pressure chamber, a control valve mechanism connected for controlling pressures in said variable pressure chamber, said valve mechanism comprising a housing having a control chamber communicating with said variable pressure chamber, a port in said housing communicating with a source of high pressure and having a high pressure valve seat opening into said control chamber, a high pressure poppet valve normally engaging said seat, a low pressure valve seat opening into said control chamber, a normally open low pressure poppet valve spaced from said high pressure valve and engageable with said low pressure seat, a lever connected to and extending transversely of the axes of said valves, a control cylinder, a control piston therein connected to said low pressure valve seat and operative for moving the latter to engage it with said low pressure valve to close the latter and move said lever to open said high pressure valve, a spring engaging said lever adjacent said high pressure valve and spaced from said low pressure valve, a casing, a diaphragm dividing said casing to form a pair of spaces one of which communicates with a source of low pressure and is in fixed communication with said low pressure valve seat, means for supplying hydraulic pressure to said control cylinder to move said control piston, and means providing restricted communication between the other space of said pair and said control chamber to balance pressures in said spaces when said low pressure valve is open and to unbalance pressures in said spaces when said low pressure valve is closed and said high pressure valve is open to unbalance pressures on opposite sides of said diaphragm and bias said low pressure valve away from its seat.

11. A motor mechanism comprising a member to be operated, a fluid motor comprising a casing, a pressure responsive unit connected to said member and forming with said casing a variable pressure chamber, and a valve mechanism connected for controlling pressure in said variable pressure chamber, said valve mechanism comprising a housing having a control chamber in fixed communication with said variable pressure chamber, said housing having a port communicating with a source of high pressure and terminating in a high pressure valve seat in said control chamber, a lever in said control chamber, a high pressure valve carried by one end of said lever and normally engaging said high pressure valve seat, a low pressure valve carried by said lever at a point spaced therealong from said high pressure valve, a tubular valve operating member having its interior communicating with a source of low pressure and having an open end normally spaced from said low pressure valve whereby said control chamber normally communicates with said source of low pressure, a spring engaging said lever between the axes of said valves to bias said high pressure valve to closed position, said spring being closer to the axis of said high pressure valve than to said low pressure valve, and means for moving said valve operating member to engage said end thereof with said low pressure valve to close said control chamber to said low pressure source and to move said lever to rock said high pressure valve on its seat to connect said port to said control chamber.

12. A mechanism according to claim 11 provided with means normally spaced from and arranged in the path of travel of the other end of such lever to limit movement thereof whereby, after such means is engaged by said other end of said lever, further movement of said valve operating member rocks said lever about such means to move said high pressure valve away from its seat.

References Cited in the file of this patent

UNITED STATES PATENTS

| | | |
|---|---|---|
| 2,332,340 | Price | Oct. 19, 1943 |
| 2,415,035 | Penrose | Jan. 28, 1947 |
| 2,433,953 | Ingres | Jan. 6, 1948 |
| 2,690,740 | Hupp | Oct. 5, 1954 |
| 2,807,239 | Grant | Sept. 24, 1957 |